UNITED STATES PATENT OFFICE.

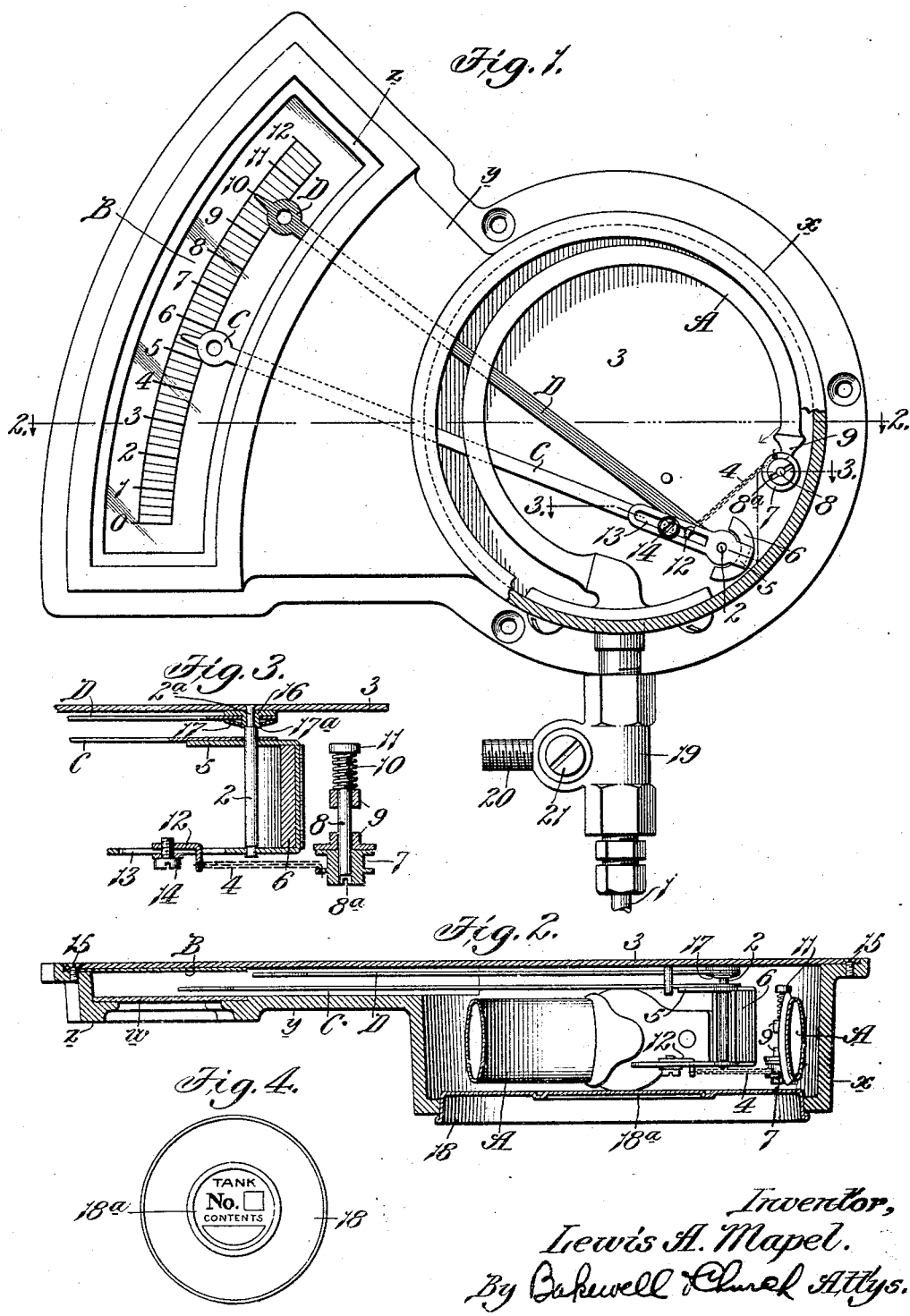

LEWIS A. MAPEL, OF ST. LOUIS, MISSOURI, ASSIGNOR TO MECHANICAL DEVELOPMENT COMPANY, OF ST. LOUIS, MISSOURI, A CORPORATION OF MISSOURI.

GAGE.

1,265,934.　　　　Specification of Letters Patent.　　Patented May 14, 1918.

Application filed January 29, 1917. Serial No. 145,149.

*To all whom it may concern:*

Be it known that I, LEWIS A. MAPEL, a citizen of the United States, residing at St. Louis, Missouri, have invented a certain new and useful Improvement in Gages, of which the following is a full, clear, and exact description, such as will enable others skilled in the art to which it appertains to make and use the same.

This invention relates to pressure and vacuum gages.

One object of the invention is to provide a gage that is more accurate and sensitive than the pressure and vacuum gages now in general use.

Another object is to provide a gage that will indicate only part of the pressure or vacuum in the system with which the gage is used.

Another object is to provide a Bourdon spring gage which is so constructed that its indicating hand will accurately register the quantity or depth of liquid in a tank or the pressure in a container, and will remain at zero when the tank becomes empty or the pressure in the container becomes exhausted, notwithstanding the fact that the Bourdon spring thereafter moves, due to a variation in the pressure or vacuum used in the system.

Another object is to provide a Bourdon spring gage in which the spring and the indicator are connected together by a flexible element that permits the spring to move in one direction beyond a certain limit without affecting the hand or causing any parts of the gage to be subjected to undue strains.

Another object is to provide a gage of the general type referred to which is so constructed that it is not necessary to remove the hands and the dial of the gage during the operation of setting or adjusting the hands, the adjustment of the hand controlled by the Bourdon spring being effected by simply turning a device that is normally concealed from view by a removable closure on the gage housing.

And still another object of the invention is to provide a Bourdon spring gage which is so constructed that it can be adjusted easily to vary the relative degree of movement imparted to the indicating hand by the spring, thereby enabling the gage to be used with different kinds of devices or apparatus of different capacity, by simply substituting different dials or dials that are graduated differently, and changing the condition of the means that transmits movement from the spring to the indicating hand. Other objects and desirable features of the invention will be hereinafter pointed out.

To this end I have devised a Bourdon spring gage in which the Bourdon spring and the indicating hand controlled by same are directly connected together by an element that exerts a direct pull on the hand when the spring moves in one direction, said hand being approximately balanced, or, in other words, constructed in such a manner that the normal tendency is to move toward zero, said element being of such a character that gravity tends to move said hand toward zero on the dial, and movement of the Bourdon spring in the opposite direction beyond a certain limit has no effect on the hand and will not result in the parts of the gage being subjected to undue strains. The element that connects the indicating hand with the Bourdon spring consists of a flexible device, and said device is combined with a means that can be easily adjusted to vary the length of said flexible device, and thus set the indicating hand at the proper position on the dial when the gage is installed. An independent means is provided for changing the point of connection between said flexible device and indicating hand, so as to vary the relative degree of movement imparted to said hand by the Bourdon spring, and thus enable dials provided with different graduations to be used in the gage without substituting a different Bourdon spring. The dial of my improved gage is arc-shaped or segmental-shaped, instead of circular, as in the Bourdon spring gages now in general use, and said dial is arranged at one side of the portion of the gage housing that incases the Bourdon spring and the means that transmits movement from the spring to the indicating hand. The gage is also provided with another hand or indicator, which I will term a stationary hand, that is adapted to be set at different positions on the dial, so as to indicate a characteristic or condition of the apparatus with which the gage is used. For example, if the gage is used for indicating the quantity of liquid in a tank, said stationary hand can be set at the proper position on the dial to indicate the capacity of the tank. Both hands of the gage turn about the same axis and a means of novel construction is provided for holding the stationary hand in adjusted position.

My improved gage can be used for any of the various purposes that vacuum or pressure gages are now used, but it is particularly adapted for use with a liquid storage apparatus of the kind described in my pending application Serial No. 99,839, filed May 25, 1916, on account of its extreme accuracy and sensitiveness. It is also well adapted for use in a hot water heating system for indicating the level or quantity of water in the expansion tank of the system, on account of the fact that any slight variation in the level of the water in the expansion tank will be shown by the gage.

Figure 1 is a front elevational view, partly broken away, of a gage constructed in accordance with my invention.

Fig. 2 is a horizontal sectional view, taken on the line 2—2 of Fig. 1.

Fig. 3 is a horizontal sectional view, taken on the line 3—3 of Fig. 1; and

Fig. 4 is a reduced front elevational view of the removable closure on the gage housing.

Referring to the drawings, which illustrate the preferred form of my invention, A designates a Bourdon spring of well known form that is arranged inside of a cylindrical portion $x$ of the gage housing, one end of said spring being closed and the other end being connected with a pressure or vacuum pipe 1 that leads to the apparatus with which the gage is used. If, for example, the gage is used for indicating the level or quantity of liquid in a tank, as described in my prior application previously referred to, said pipe 1 leads to the tank (not shown) that contains the liquid. The gage is provided with an arc-shaped or segmental-shaped dial B that is arranged at one side of the portion of the gage housing in which the Bourdon spring is incased and two hands or indicating devices C and D that coöperate with said dial. The hand C, which is controlled by the Bourdon spring A, is pivotally mounted on a horizontally-disposed shaft 2 carried by the rear wall 3 of the gage housing, as shown in Fig. 3, and a flexible connecting device 4 is arranged between the free end of the spring A and the hand C, so as to exert a direct pull on said hand when the free end of the spring A flexes in one direction. The hand C is approximately balanced or constructed in such a manner that when it is not connected with the Bourdon spring or when the free end of said spring, in flexing in the opposite direction, reaches such a position that the flexible member 4 does not exert a pull on the hand C, said hand will stand at a point slightly below zero on the dial, being held in this position by a portion of the housing. While said hand can be constructed in various ways, I prefer to secure the hand C to a substantially U-shaped member 5 oscillatingly mounted on the shaft 2 and provided on its cross piece with a counterweight 6 which weighs slightly less than the hand C, so that gravity will tend to move the hand C downwardly over the dial toward zero. The flexible member 4 that connects the hand C directly with the Bourdon spring A preferably consists of a piece of chain whose lower end is connected to the front leg or side piece of the U-shaped member 5 that carries the hand C and whose upper end is connected to an adjustable device on the Bourdon spring that can be turned so as to vary the length of the flexible member 4, and thus adjust the hand C relatively to the spring A. In the form of my invention herein illustrated the upper end of the chain 4 is connected to a sheave 7 that is rigidly secured to a shaft 8 which is adjustably mounted in bearings 9 on the free end of the Bourdon spring A, as shown in Fig. 3, said sheave or the end of the shaft 8 being provided with a slot $8^a$, into which a screwdriver can be inserted, so as to turn said shaft, and thus wind the chain 4 onto or off of the sheave 7. The shaft 8 passes loosely through both of said bearings 9 and a coiled spring 10 is arranged between the rear bearing 9 and a head 11 on the inner end of the shaft 8, so as to move said shaft longitudinally of the bearings 9, and thus cause the rear side of the sheave 7 to exert sufficient pressure on the front bearing 9 with which it contacts to frictionally hold the shaft 8 and sheave 7 in adjusted position.

In order that the relative degree of movement imparted to the indicating hand C by the Bourdon spring A may be varied, and thus enable differently graduated dials to be used in the gage, I have provided the gage with a means for changing the point of connection between the lower end of the chain 4 and the hand C, so as to cause the chain 4 to exert more or less leverage on the hand C, according to the point of connection between the chain 4 and hand C. In the form of my invention herein illustrated this is effected by connecting the lower end of the chain 4 to a block or bracket 12 that is adjustably mounted in an elongated slot 13 formed in the front side piece of the U-shaped member 5 that carries the hand C, the bracket 12 being held in adjusted position on the member 5 by means of a clamping screw 14. By loosening the screw 14 and moving the part 12 to which the chain is connected toward or away from the shaft 2 about which the hand C oscillates, the relative degree of movement imparted to the hand C by the Bourdon spring A can be easily varied. For example, if the dial B is provided with twelve main divisions, the part 12 can be set in such a position that a certain degree of expansion of the spring A will cause the hand C to move upwardly over the entire length of the dial B. If the dial is provided with twenty-four main divisions, the part 12 can be moved farther from the axis of oscillation of the hand C, so that the same degree of expansion of the spring A will cause the hand to move upwardly over only half of the length of the dial and approximately twice the degree of expansion of the spring A will cause the hand C to move upwardly over the entire length of the dial. This is a very desirable feature in a pressure or vacuum gage, as it enables the gage to be used with apparatus of different capacity, by simply substituting a different dial and changing the point of connection between the chain 4 and the member 5 that carries the hand C. The gage housing is provided with a laterally-projecting portion $y$ that has an arc-shaped or segmental-shaped sight opening $z$ in same over which a piece of glass $w$ or other transparent material is arranged, and the entire back plate 3 of the gage housing is so formed that it can be removed from the remainder of the housing. The back plate of the housing carries the shaft 2 and the hands mounted on said shaft, and consequently, the gage can be manufactured cheaply and assembled easily. When it is desired to change the dial B, which preferably consists of a piece of cardboard or other suitable material that is secured to said back plate, this can be accomplished easily, by simply removing the back plate, the back plate 3 being retained in position by means of screws 15, shown in Fig. 2.

The stationary hand D, previously referred to, is journaled on a hub 16, shown in Fig. 3, that is mounted on a reduced portion $2^a$ of the shaft 2, and a spring washer 17 is interposed between the front side of said hand D and a flange $17^a$ on the hub 16, so as to exert sufficient frictional pressure on the hand D to hold it in adjusted position. The reduced portion $2^a$ of the shaft 2 passes through a hole in the back plate 3 of the gage housing and is upset, so as to securely connect the shaft 2 to the back plate 3, and the hub 16 is held securely in position against the back plate 3 by the shoulder on the reduced portion of said shaft that bears against the front end of said hub, as shown in Fig. 3. It is, of course, immaterial, so far as my broad idea is concerned, how the hands C and D are mounted, but I prefer to mount them in the manner described, as such a construction is efficient, simple and inexpensive to manufacture. As previously stated, the function of the hand D is to indicate a characteristic or condition of the apparatus with which the gage is used. For example, if the gage is used for indicating the quantity of liquid contained in a tank whose depth is ten feet, the hand D can be set at the numeral 10 on the dial B, so as to show the capacity of the tank. If it is used with a tank whose capacity is eight gallons, it can be set at the numeral 8 on the dial. While the hand D is not essential, it is desirable to equip the gage with such a hand, as it forms a convenient means for indicating the maximum capacity of the tank or apparatus with which the gage is used (an essential requirement of a successful commercial gage) and overcomes the necessity of changing the dial when the gage is used with tanks or apparatus of only slightly different capacity.

The cylindrical portion $x$ of the gage housing in which the Bourdon spring is arranged is provided with a removable closure or cover 18 that preferably consists of a compression lid that can be forced into an opening in the front wall of said cylindrical portion $x$, so as to exclude dust, dirt or other foreign matter from the gage housing. The lid 18 can be removed or arranged in operative position quickly, and when it is removed, the spring A and the various devices for adjusting the gage are all exposed to view. If desired, the lid or cover 18 can be provided at its center with a portion $18^a$ of circular shape or any other desired form in which a label can be arranged, as shown in Fig. 4, so as to designate the particular apparatus with which the gage is used and the function or capacity of said apparatus or what it contains. If, for example, the gage is used for indicating the level or the quantity of liquid in a tank, the number of the tank and the particular kind of material in same can be printed on the label that is arranged in the space at the center of the cover 18 of the gage housing. The gage preferably comprises a connecting device 19 that is arranged between the Bourdon spring A and the pipe 1 that leads to the apparatus with which the gage is used, and said connecting device is provided with a nipple 20 to which a pump or other suitable suction device can be connected, so as to draw liquid up into the pipe 1 and exhaust air from the Bourdon spring A when the gage is used in connection with a liquid storage apparatus of the kind described in my application previously referred to, or when it is desired to have the gage act as a vacuum gage as distinguised from a pressure gage, the connecting device 19 being provided with a cock or valve 21 that can be closed after the column of liquid has been established in the pipe 1.

A gage of the construction above described is more sensitive and accurate than the type of vacuum and pressure gage that is now generally used, on account of the fact that there are no parts between the Bourdon spring and the indicating hand C that develop friction when the gage is in operation, or which set up a force that counteracts on the Bourdon spring and tends to restrict the free operation of same, as in one type of gage that is now used extensively, in which the means used for transmitting movement from the spring to the indicating hand consists of coöperating toothed members that are held in engagement with each other by a spring. In fact, in my improved gage there is only one bearing, namely, the shaft 2, and the means that transmits movement from the Bourdon spring to the indicating hand C consists of a chain or piece of flexible material that directly connects said elements together, and which at no time exerts a counteracting force on the Bourdon spring. Another desirable feature of such a gage is that the indicating hand C always shows the exact condition of the apparatus with which the gage is used. This is not true of the type of gage referred to, in which the indicating hand revolves about a circular dial, for with such a gage it is possible for the indicating hand to move past zero and then start on another revolution of the dial, if the condition of the column of liquid between the gage and the apparatus with which it is used becomes changed, thus causing the hand to indicate a condition that does not exist. For example, if a circular dial gage were used for indicating the level or quantity of liquid in a tank arranged a great distance below the gage, the indicating hand would move to zero when the tank became empty, and thereafter, if some of the liquid escaped from the pipe arranged between the gage and the tank, the indicating hand would start on another revolution of the dial, thus indicating that the tank was full, or nearly full, when, as a matter of fact, the tank would be empty. Nor could this defect be remedied by providing a stop to prevent the indicating hand from moving past zero, for if a stop were employed, the parts of the gage would be subjected to undue strain, in case the Bourdon spring contracted abnormally, owing to the fact that the movement of said spring is transmitted to the indicating hand by means of gears or toothed members. In my improved gage it is impossible for the indicating hand to move past zero. Consequently, the gage will not give a false reading, in case the column of liquid in the pipe 1 becomes changed from its normal condition. Furthermore, the gage is so constructed that abnormal contraction of the Bourdon spring does not result in the parts of the gage being subjected to undue strains, this being due to the fact that the Bourdon spring and indicating hand are connected together by a flexible element which becomes slack when the Bourdon spring contracts after the indicating hand has reached zero. The gage can be adjusted easily when it is installed without the necessity of removing the hands and the dial; it can be used with apparatus of great or small capacity, by simply changing the position of the part 12 to which the lower end of the flexible member 4 is connected, and substituting a different dial, and it comprises an easily adjustable means, namely, the hand D, for indicating the maximum capacity of the apparatus with which the gage is used.

Having thus described my invention, what I claim, and desire to secure by Letters Patent, is:

1. A gage, comprising a Bourdon spring, a pivotally mounted indicating hand, a dial, and a chain or similar element connected at one of its ends to the free end of said spring and at its opposite end to said hand at a point intermediate the free end of said hand and its axis of movement for moving the hand away from zero on the dial when the Bourdon spring flexes in one direction and for permitting said hand to return to and stand at zero on the dial when said hand strikes a stop and said spring flexes in the opposite direction beyond a certain limit.

2. A gage, comprising a Bourdon spring, a pivotally mounted indicating hand, a dial, a flexible device connected to the free end of said spring and to said hand at a point between one end of said hand and its axis of movement, and an adjustable element onto which said flexible device can be wound so as to vary the length of the portion of said flexible device between said hand and spring and thus enable said hand to be set at the proper position on the dial.

3. A gage, comprising a Bourdon spring, a pivotally mounted indicating hand, a winding device on said spring, and a flexible element connected at one end to said hand and having its opposite end connected to said winding device, said winding device being adapted to be turned so as to vary the length of the portion of said flexible element between said hand and spring.

4. A gage, comprising a Bourdon spring, a pivotally mounted indicating hand, a flexible element connected to said hand, a winding device on said spring to which the opposite end of said flexible element is connected, and means for holding said winding device in adjusted position.

5. A gage, comprising a Bourdon spring, a pivotally mounted indicating hand, a flexible element connected to said hand, a shaft rotatably mounted in a bearing on the free end of said spring and provided with a sheave to which said flexible element is connected, and a resilient means that holds said sheave pressed tightly against the bearing in which said shaft is mounted, and thus prevents said shaft from moving accidentally.

6. A gage, comprising a Bourdon spring, a substantially segmental-shaped dial arranged at one side of said spring, a pivotally mounted indicating hand arranged at one side of said dial so that the free end of same will travel over said dial, and a flexible element having one of its ends connected to the free end of said Bourdon spring and connected at its opposite end to said indicating hand at a point between the axis of said hand and the free end of the hand so as to exert a direct pull on said hand when the Bourdon spring flexes in one direction.

7. A gage, comprising a Bourdon spring, a housing for said spring, a shaft supported by said housing, a counter-weighted device pivotally mounted on said shaft, an indicating hand secured to said counterweighted device, a dial that coöperates with the free end of said hand, and a chain or other flexible element connected at one of its ends to the free end of said Bourdon spring and at its opposite end to said counterweighted device so as to move said indicating hand when said Bourdon spring flexes in one direction.

8. In a gage of the character referred to, a housing, a shaft having a reduced portion which passes through one wall of said housing, a hub on said reduced portion that is clamped against said wall, an adjustable hand oscillatingly mounted on said hub, and a spring washer on said hub that bears against said hand and holds it in adjusted position.

9. A gage, comprising a Bourdon spring, a pivotally mounted indicating hand, a flexible element that transmits movement from said spring directly to said hand, means for varying the length of the portion of said element that extends between said spring and arm, and an independent means for varying the leverage that said element exerts on said arm.

10. A gage, comprising a Bourdon spring, a pivotally mounted indicating hand, a flexible element that transmits movement from said spring directly to said hand, means for varying the length of the portion of said element that extends between said spring and arm, a device carried by said arm to which said flexible element is connected, and means for enabling said device to be adjusted toward or away from the axis of oscillation of said arm so as to vary the relative degree of movement imparted to said arm by said spring.

LEWIS A. MAPEL.

Copies of this patent may be obtained for five cents each, by addressing the "Commissioner of Patents, Washington, D. C."